United States Patent [19]
Nichols

[11] 3,900,981
[45] Aug. 26, 1975

[54] ANIMAL IDENTIFICATION TAIL TAG
[75] Inventor: Harley E. Nichols, Hardwick, Vt.
[73] Assignee: C. H. Dana Company, Inc., Hyde Park, Vt.
[22] Filed: Aug. 6, 1973
[21] Appl. No.: 385,996

[52] U.S. Cl. .................................................. 40/300
[51] Int. Cl. ............................................. G09f 3/00
[58] Field of Search .............................. 40/300–304, 40/2 F; 138/46 R, 46 A, 4 T, 48 R; 119/1, 105

[56] References Cited
UNITED STATES PATENTS

| | | | |
|---|---|---|---|
| 1,078,808 | 11/1913 | Stegner | 119/105 |
| 1,089,508 | 3/1914 | Smith | 119/105 |
| 2,079,053 | 5/1937 | Torbert | 40/300 UX |
| 3,417,761 | 12/1968 | Kulnis et al. | 132/46 R |

FOREIGN PATENTS OR APPLICATIONS

| | | | |
|---|---|---|---|
| 1,111,418 | 4/1968 | United Kingdom | 40/300 |
| 597,766 | 1/1932 | Germany | 119/105 |

Primary Examiner—Robert W. Michell
Assistant Examiner—A. Heinz
Attorney, Agent, or Firm—Prutzman, Hayes, Kalb & Chilton

[57] ABSTRACT

An animal identification tail tag adapted for secure attachment to the hair of the animal's tail comprising a substantially planar identification panel having an enlarged symbol display area, a hair engaging and retaining portion at one end of the panel and flexible stabilizing means in the form of side arms adapted to loosely encircle the tail of the animal to facilitate stabilized retention of the display area in a readily viewable location. A clamping assembly is provided with clamping surfaces mounted in confronting relationship with the hair engaging portion of the panel and with fastening means for drawing the clamping surfaces towards the panel to affect cooperative clamping retention and anchoring of a portion of the tail hair or the animal between the panel and the clamping surface without applying pressure to the sensitive skin area of the animal's tail.

2 Claims, 4 Drawing Figures

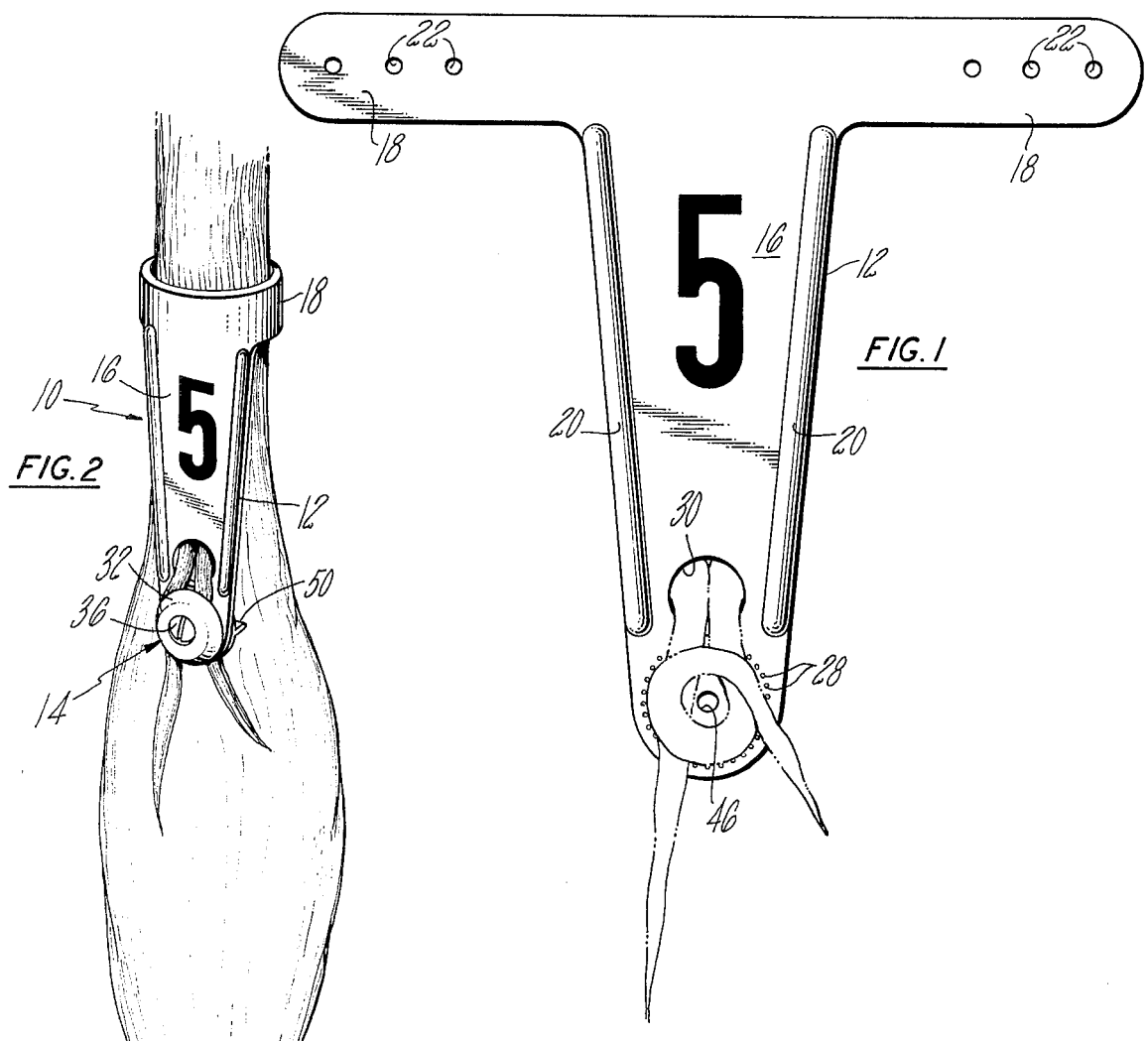
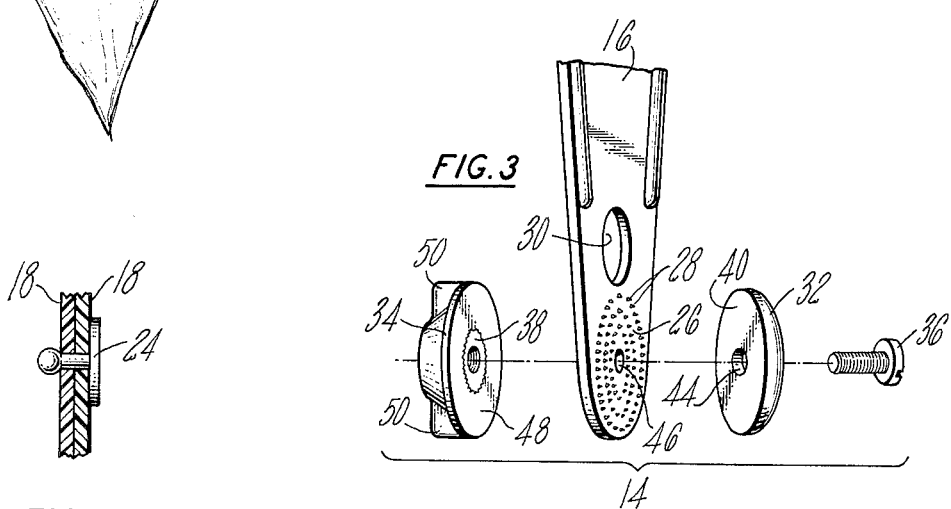

ANIMAL IDENTIFICATION TAIL TAG

The present invention relates generally to animal identification tags and is particularly concerned with a new and improved tail tag for identification of cattle and the like, particularly dairy cattle.

In recent years there has been an increased need to provide identification of dairy cows and similar animals in order to maintain appropriate production and cost records, such as records of the milk producing capability of the animal compared to the cost of feed, in order to determine which animals should be "culled" from the herd to provide optimum herd efficiency. Additionally, since the milking operation is frequently conducted on a production line basis it is difficult for the dairyman to keep track of the necessary information with respect to a large number of animals unless an appropriate identification system is utilized. In fact, in modern milking parlors, particularly in those establishments utilizing a herringbone arrangement of milking stalls where only the lower portion of the animal is visible and accessible, the problem of identifying a particular animal becomes more acute and the visibility and accessibility of identification tags utilized herefore is substantially reduced. In the herringbone arrangement of milking stalls the person responsible for the milking operation is generally located in a central pit below the level of the animals and ear tags, neck chain tags, strap tags, brands and the like have substantially limited value in providing appropriate identification since such tags require the dairyman to leave the milking pit in order to check the tag or similar identification device.

It has been suggested that tail tags would obviate many of the deficiencies experienced herefore with other identification systems; however, tags of this nature have not proved successful. As would be expected, a tag which is applied too loosely to the animal is soon flicked off by the animal as its tail swishes about. Conversely, where a tag is applied too tightly it tends to cut off the circulation within the large vein that runs the length of the tail just under the animal's skin. This causes substantial irritation to an extremely sensitive portion of the animal and the constant irritant seriously hampers the milk output of the animal. In extreme cases loss of the animal's tail can occur.

Accordingly, it is a primary object of the present invention to provide a new and improved animal identification tail tag that will be retained on the animal despite the whip-like action of the tail, yet completely avoids the application of any pressure on the sensitive tail area of the animal and therefore causes no pain or undesirable irritation to the animal that might affect milk output.

Another object of the invention is to provide a new and improved tail tag of the type described that is of relatively low cost and can easily be applied to provide quick accessible identification of the animal without the necessity of branding, ear punching, and possible infection to the animal. Included in this object is the provision for a durable, non-corrosive, plastic tail tag that exhibits a high degree of flexibility consistent with the natural flexibility of the animal's tail so as not to cause discomfort or irritation to the animal.

Still another object of the present invention is to provide a new and improved tail tag of the type described that tenaciously adheres to the tail by relying upon the holding power of the hair in the lower part of the animal's tail.

Other objects will be in part obvious and in part pointed out in more detail hereinafter.

These and related objects are accomplished in accordance with the present invention by providing a new and improved animal identification tail tag adapted for secure attachment to the hair of the animal's tail comprising a substantially planar identification panel having an enlarged symbol display area, a hair engaging and retaining portion at one end of the panel and flexible stabilizing means adapted to loosely encircle the tail of the animal to facilitate stabilized retention of the display area in a readily viewable location. A clamping member having a clamping surface is mmounted in confronting relationship with the hair engaging portion of the panel and is provided with fastening means for drawing the clamping member towards the panel to affect cooperative clamping retention and anchoring or a portion of the tail hair of the animal between the panel and the clamping surface without applying pressure to the sensitive skin area of the animal's tail.

A better understanding of the objects, advantages, features, properties and relations of the invention will be obtained from the following detailed description and accompanying drawing which set forth certain illustrative embodiments and are indicative of the various ways in which the principle of the invention is employed.

BRIEF DESCRIPTION OF THE DRAWING

In the drawing:

FIG. 1 is a plan view of a flexible animal identification tail tag embodying the features of the present invention;

FIG. 2 is a perspective view of the animal identification tail tag of FIG. 1 secured to the tail of an animal;

FIG. 3 is an exploded perspective view illustrating the hair clamping assembly of the tail tag of FIG. 1; and FIG. 4 is a sectional view illustrating one manner in which the flexible stabilizing arms of the tail tag of FIG. 1 are interconnected.

DESCRIPTION OF A PREFERRED EMBODIMENT

Referring now to the drawing in greater detail wherein like reference numerals indicate like parts throughout the several figures, the invention is illustrated as embodied within a flexible plastic tail tag designated generally by the numeral 10. Referring first to FIG. 2, the tag 10 consists of a flexible sheet-like plastic member 12 having a clamping assembly 14 mounted on the lowermost end thereof. As illustrated, the planar plastic member 12 is of T-shaped configuration and includes an elongated, slightly tapered identification or display panel 16 as the main stem portion of the T-shaped configuration and a pair of flexible arms 18 extending integrally outwardly from opposite sides of the panel 16 at the broadest end thereof. The panel 16 is a sheet-like material of substantially uniform thickness throughout its extent and exhibits a slight converging taper towards its free end. Reinforcing ribs 20 project from one surface of panel 16 and extend along opposite edges thereof to provide flexural stability throughout the longitudinal extent of the symbol display area 16.

Each side arm 18 is provided with a plurality of small aligned holes 22 near the free ends of the arms. The holes 22 are appropriately spaced so that when the side arms are bent rearwardly to encircle the tail of the animal and the free ends thereof are overlapped, the holes 22 will be brought into registry and can be used to effect a secure interconnection of the arms by a suitable plastic fastener such as the snap-on button-type plastic fastening member 24 shown in FIG. 4.

As mentioned, the central display portion 16 of the tag tapers inwardly toward its free end where it terminates in a hair retaining or anchoring area 26 having a multitude of pin-like protrusions or serrations 28 extending outwardly from the surface of the plastic member. 12. An enlarged aperture 30 is formed in the tag immediately above area 26 between the protrusions 28 and the symbol display area 16. The aperture 30 is of sufficient size to permit a substantial quantity of hair to be drawn therethrough for engagement by the clamping assembly 14.

A relatively simple hair clamping assembly 14 is mounted over the serrated area 26 and includes complementary front and rear clamping discs, 32, 34 respectively, located on opposite sides of member 12 and interconnected thereto by means of the bolt 36 and a complementary threaded metal insert 38 embedded within the disc 34. The front or primary clamping disc 32 is provided with a flat clamping surface 40 arranged in confronting relationship with the pin-like protrusions 28 and with a smooth exterior surface having rounded edges to prevent snagging on wire fences or the like. The threaded fastener 36 extends through the countersunk central aperture 46 in area 26 so as to be received within an internally threaded metal insert 38 of disc 34 positioned in confronting relationship with the rear surface of the panel. The disc 34 is also provided with a flat clamping surface 48 and exterior wing-like extensions 50 to aid in tightening the clamping assembly.

As mentioned, the identification tag is preferably a molded plastic member but may also be cast to the desired shape and thickness. However, as will be readily appreciated the tag may be cut or punched from flexible plastic sheet material if the manufacturer is willing to sacrifice certain features such as the reinforcing ribs 20 and the pin-like protrusions 28 in the hair-anchoring area 26. The plastic material should be a durable, non-corrosive material capable of withstanding the environmental conditions to which an animal tail tag is subject while retaining the requisite identification features such as a characteristic color, the painted or hot stamped numerals or other coding normally applied to such identification tags. In this connection, flexible polyolefin plastics such as polypropylene or similar flexible materials exhibiting good hydrolytic stability may be employed. In the preferred embodiment a polyurethane plastic has been found to give excellent results due to its stability under practical use requirements such as its stability under barn and milking parlor conditions including resistance to the effects of the animal's urine. In this connection, the specific polyurethane plastic found to exhibit consistently good results is a material sold under the name "General Purpose CPR2103-55D" by the CPR Division of The Upjohn Company. However, as will be appreciated, other suitable materials exhibiting the requisite environment stability and flexibility may be utilized. It is important that the material exhibit a flexibility that will permit bending or folding of the sidearms around the tail of the animal without breaking and provide a flexibility in the display panel which is complimentary to the natural flexibility of the animal's tail.

The clamping discs 32 on the other hand, are generally made from a more rigid plastic material in order to provided the desired firm clamping action. In this connection excellent results have been achieved when using discs made of nylon or other suitable plastics that are capable of providing the requisite clamping power for anchoring the tag to the hair in the animal's tail.

The tag is easily applied to the tail of the animal by looping the flexible side arms 18 around the tail so as to completely encircle the tail and overlap the free end portions thereof. A snap fastener such as button 24 is then used to secure the free ends of the arms 18 while assuring that the arms do not compressively engage the tail of the animal so as to cause discomfort or irritation. For dairy cows, the arms are generally applied to the tail at a location just above the "bush" in the lower portion of the tail. Subsequently, a portion of the hair in the "bush" or "switch" is drawn through the enlarged circular aperture 30 and is placed over the hair-retaining area 26 for engagement by the serrations 28 and the confronting clamping surface 40 of the front disc 32. As best illustrated in FIG. 1, excellent retaining or anchoring results have been obtained if the hair extending through the aperture 30 is divided into two sections with one section merely extending downwardly across the serrated hair-retaining portion 26 while the second section is crossed over the first section or wrappped in a circular manner about the threaded fastening bolt 36. Tightening of the bolt will cause the flat clamping surface 40 of the clamping disc 32 to push the hair into the protruding serrations 28 to provide the desired holding power required for retaining the tag on the tail despite the whip-like action to which the tag will be subjected.

Alternatively, a portion of the hair within the "switch" may also be inserted between the clamping surface 48 of the rear disc 34 and the rear surface of member 12 to provide additional anchoring of the tag. As will be appreciated, corresponding serrations or other techniques can be used in securing the animal's tail hair to the tag to provide the desired holding characteristics since it is the tremendous holding power of the hair that lies in the animal's tail that is providing the requisite retention of the tag on the tail. The clamping assembly merely assures that the hair holds the tag in a viewable location. The arms 18 which encircle the tail do not compressively engage the tail but provide a location stabilizing function to maintain the tag and the symbol-bearing panel 16 in an appropriate orientation.

As will be apparent to persons skilled in the art, various modifications, adaptations and variations of the foregoing specific disclosure can be made without departing from the teaching of the present invention.

I claim:

1. A flexible animal identification tail tag for secure attachment to the hair in the animal's tail and for retention of the tag on the tail despite a whip-like action of the tail comprising a substantially planar identification panel having a symbol display area and a hair engaging and retaining area, a clamping member having a clamping surface in confronting relationship with the hair engaging and retaining area, said panel being provided with an aperture of sufficient size to permit the ready passage therethrough of a weft of hair for retentive confinement between the panel and the clamping member, fastening means for drawing the clamping member toward the panel to effect cooperative retention and tight clamping and anchoring of a portion of the tail hair of the animal between the hair engaging and retaining area of the panel and the clamping surface without applying undue pressure to the sensitive skin area of the animal's tail and a pair of flexible arms extending integrally from the panel in opposite directions to fully and loosely encircle the animal's tail without applying pressure thereto, said clamping and anchoring being sufficient to retain the tag on the tail despite rapid swishing of the tail by the animal.

2. A flexible animal identification tail tag of T-shaped configuration for secure attachment to the hair in the animal's tail and for retention of the tag on the tail despite a whip-like action of the tail comprising a substantially planar identification panel comprising a portion of the T-shaped configuration and having a symbol display area and a hair engaging and retaining area, a clamping member having a clamping surface in confronting relationship with the hair engaging and retaining area, fastening means for drawing the clamping member toward the panel to effect cooperative retention and tight clamping and anchoring of a portion of the tail hair of the animal between the hair engaging and retaining area of the panel and the clamping surface without applying undue pressure to the sensitive skin area of the animal's tail and a pair of flexible arms extending integrally outwardly from the panel in opposite directions as a crossbar portion of the configuration to fully and loosely encircle the animal's tail without applying pressure thereto, said clamping and anchoring being sufficient to retain the tag on the tail despite rapid swishing of the tail by the animal, said arms being provided with means for joining the free ends thereof together.

* * * * *